UNITED STATES PATENT OFFICE.

RICHARD GUELTON, OF BRIGHTON, COUNTY OF SUSSEX, ENGLAND.

PROCESS OF PRODUCING ARTIFICIAL MARBLE AND RENDERING THE SAME FIRE-PROOF AND WATER-PROOF.

SPECIFICATION forming part of Letters Patent No. 290,417, dated December 18, 1883.

Application filed November 16, 1883. (No specimens.)

*To all whom it may concern:*

Be it known that I, RICHARD GUELTON, of the city of Brighton, in the county of Sussex, England, have invented a new and useful Improved Process for Producing Artificial Marbles and Rendering the same Water-Proof and Fire-Proof, of which the following is a full, clear, and exact description.

This artificial marble, which is a new product of manufacture, is produced in slabs, for the production of which I use a smooth surface, preferably glass, which should rest horizontally.

For molded patterns I make use of a mold, preferably made of cement.

To produce imitations of brèches marbles—such as brèche violette, sarancolino, and others—I use pieces of pasteboard or suitable material cut in a great variety of sizes, so as to produce the brèches of real marbles. These pieces of pasteboard are, preferably, about one-fourth inch thick, so that I may form on their edges, with shaded cement, the veins which always separate the brèches from the other parts of the marbles.

In the manufacture of my imitation marbles I prefer to form the same of two coats—the face or veined coat, to imitate marble, and a backing or supporting coat. The first coat is made of superfine cement mixed with coloring-matter, and the second one of coarse cement.

I trace the veins on the smooth surface or the face of the mold by hand or tool by means of fibers of silk, previously soaked either in colored water or shaded cement. Then on these veins I lay the background of the face of the marble, and level carefully with a trowel or any other suitable tool; and in order to harden or dry this ground while it is in a soft state, I soak off the superfluous water used to dilute the cement by sifting carefully a coat of dry coarse cement about half an inch thick on it, (the background.) When this coarse cement has soaked up as much moisture as it can, I remove it with a trowel and rub the surface from which the cement has been removed with a polished trowel for a few minutes, to smooth down any roughness. Then, to soak off entirely any remaining moisture, I sift on again another coating of dry cement, which I remove in about ten minutes, and rub again with polished trowel. The rubbing must be done carefully, so as not to disturb the face. Then I mix the coarse cement just removed with sufficient water to form it into a thick paste, which I spread on the back, and level it with a trowel or straight-edge. I form this backing-coat about half an inch thick.

For the purpose of hardening the backing, I mix a small quantity of sulphate of iron in it; and to strengthen the backing I place in it pieces of slate, or iron rods.

For setting of the cement, I allow from sixteen to twenty-four hours, remove the mold, and leave the article to dry thoroughly. When this has taken place, (usually in two or three days,) I rub the face with a smoothing-stone—such as pumice-stone and water—to make the same quite smooth; then with superfine cement and water I carefully stop the pores—small holes of the face—using a suitable brush—such as a painter's brush; then I remove all superfluous stopping with a flat thin piece of wood or metal. When this stopping-coat is quite set, which will require not less than twenty-four hours, I rub the face again with a polishing-stone until quite smooth and shows no pores. After drying perfectly, I polish with putty-powder or other suitable polishing agent.

To make the back water-proof I use the following mixture: brick-dust, thirteen parts; litharge, one part, mixed with sufficient boiled linseed-oil to form a paste, which I apply to the back with a hard brush or a thin blade of polished metal.

To water-proof the face I polish it with the following mixture: white shellac, spirits of wine, naphtha, and turpentine, dissolved together. I lay this mixture on with a soft rag and rub gently until I get a bright polish. To facilitate the spreading of this mixture and prevent thickening, I use a small quantity of oil.

To render my artificial marble fire-proof I use the following mixture: brick-dust, about twelve parts; chalk, six parts; sand, six parts, and about twenty-four parts of amiante or asbestus, in powder, the whole well mixed together with a small quantity of silicate of potassium and sufficient water to form a thick paste, which I spread on the back part and expose to a heat of about 120° Fahrenheit for about twenty-four hours.

To produce a kind of crystallization on the grained coat or face of the marble, I mix with the cement alum and alabaster, and mix with warm water, and cast the article to be made in a warm room. When this casting is done, I submit it to a cold current, produced by any well-known means, during the time of the setting of the cement. In frosty weather this result is obtained by the removal of the object from the warm room to another open to the atmosphere. This crystallization is produced by the chemical action of the alum with the alabaster and cement.

To produce bright spots found in most colored marbles, I use slices of alabaster about one-eighth inch thick. These slices I break in small pieces, according to the marble to be imitated. These pieces are either pressed through the face while it is soft or by sticking them lightly in the mold before the face-coat is put down. When a great quantity of these pieces is required in the face—as in granite, porphyry, brocatella, and such like kinds of marbles—I mix them with the cement that forms the facing-coat; and to produce a quick setting of this I mix in the cement an extra quantity of alum or mix the cement with water in which the alum has been dissolved.

To produce imitations of the following marbles—rouge royal or Belgian red—I use the following colors: light purple brown, dark purple, brown burnt sienna, a small quantity of vermilion, and of dark orange chrome, Chinese blue, and ivory-black. I dilute the quantity of cement required to form the grained coat or face; of this quantity of diluted cement I put a part, about one-twentieth, so as to form the veins. Then I divide this one-twentieth of the quantity of cement into four parts. I shade the first part of a whitish tint, with a little of black and blue, the second part of a light yellowish tint, and the two other parts with some blue black and a little of light purple brown. One of these two last parts must be of a rather dark bluish tint, and the other one a little paler and a little of a reddish tint. With the nineteen-twentieths of diluted cement I form the background. To shade this quantity, (nineteen-twentieths,) I use all the before-mentioned colors except the orange chrome. I divide this cement in four parts, in the following proportions: To half the diluted cement I give a rather dark brownish tint; to about three-twentieths, a little darker than the first part; to five-twentieths the burnt sienna must prevail, and must be paler than the two first parts. In the fourth about one-twentieth the light purple brown must prevail, and as this part must be the brightest of all, a little of vermilion may be added. All the tints must be colored according to the shades of the marble to be imitated. Then I take a piece of plate-glass about two feet square in size, on which I put a part of each tint prepared for the veins, and I take care to keep these tints apart from each other when on the piece of plate-glass. Then I take a net formed of fibers of silk or other suitable material, which I soak in the tinted cement on the plate of glass. When well soaked, I spread it and touch the face of the mold or the smooth surface, so as to trace the veins. Then I rinse it off with care and make it touch the face of the mold again. When the fibers of this net are too dry, I soak them again in the tint before mentioned, and make it touch again the face of the mold, as before. I repeat this till the veins are complete.

To form some kind of patches here and there, as is found in real marble, I use a small spoon at each end. These patches are formed with parts of the tints used to trace the veins. When the veins are all traced, I form the background with the four dark tints prepared for this purpose.

To lay the veins on the background, I use my hand instead of tool, and to form the graining-figures I mix these four tints a little together; but I take care to produce various shades. Then before the veins are all covered I throw with one hand through this background the remainder of the tints used for the veins and patches, so as to form the whitish and gray bluish spots which are to be found in the real marble. Then I cover all the veins with the remainder of the tints either used for the background or the veins. Then I complete the object or slab as before stated.

*Black and gold.*—To produce this marble I use the following colors: ivory drop-black, ultramarine-blue, raw sienna, burnt sienna, red chrome, orange chrome, and vermilion. These three last colors must be used in a very small quantity. Of the quantity of cement diluted, according to the size of the object to be made, I take off about one twenty-fourth. I divide this one twenty-fourth in six parts in basins. Then I shade these six parts as follows: the first with raw sienna, the second with burnt sienna, the third with red chrome, the fourth with orange chrome, the fifth with vermilion, and the sixth with ultramarine-blue. The five first shades must be mixed slightly together, so as to produce the various shades of the veins. The sixth part must be tinted with a little blue and black, so as to form the small whitish patches and veins; with the remaining twenty-three twenty-fourths of the diluted cement I make two shades to form the background. One of the two shades must have a blue-black tint and rather dark. The other tint must be paler than the first one, and must be of a grayish tint. When all the shades are prepared, I put on the piece of plate-glass before mentioned a part of each of the six tints prepared to trace the veins. Then with the small tool before mentioned I trace the veins on the face of the mold with six tints. On the plate-glass on some parts I use small nets or a single fiber. When these veins are entirely traced, I allow them to become hard during a few minutes; then I lay on the veins the background with the two tints prepared for this purpose. I lay down this background with one hand; but I take care not to disturb the figures of the veins. When the surface of the mold or the smooth surface is covered entirely, I complete the marble as described.

*St. Ann, (Belgian marble.)*—To produce this marble I use the following colors: ivory drop-black, Chinese blue, light purple brown, and a very small quantity of orange chrome. Of the quantity of diluted cement required according to the size of the object to be formed in marble I take about one-sixteenth, which I divide into four parts. Then I divide the other fifteen-sixteenths into three parts to form the background of the marble. To the first part (about six-sixteenths) I give a dark tint with the ivory-black, Chinese blue, and light purple brown. To the second part (about six-sixteenths) I give a lighter tint than to the first part, and though the same colors are used the Chinese blue must prevail. The third part must be also of a dark tint, but the light purple brown must prevail. When these three tints are ready, I shade the four small parts to form the veins. (All these parts must be lighter than the lightest parts of the background.) The first part I tint with a part of the lightest tint prepared for the background; so also the second one, but a little lighter than the first one. The third must be of a whitish tint, but shaded with a little black and blue. The fourth part (a very small one) I tint with a very little quantity of orange chrome. When all these tints are prepared and the face of the mold or the smooth surface ready, I put on the top of plate-glass before mentioned a part of each tint prepared for the veins. Then with a net made according to the figures of the marble I trace the veins on the face of the said mold or smooth surface by the same means already described to trace the veins of the rouge royal. I also form some patches here and there by the same means used for the rouge royal. When all the veins are traced, I take, first, a small quantity of the darkest tint prepared for the background, which I put in a basin. Then with one hand I throw this cement on the veins, but I take care not to cover them entirely. Then I do the same with a small quantity of the second part, as well as with the third. Then with the remainder of the tint used for the veins I form some light grayish parts and spots by throwing this tinted cement with a certain force, so as to cause it to pass through the thin coat of the background and appear on the front. Then I cover entirely these veins with the remainder of the tinted cement prepared for the background. Then I complete as described.

*Vert de mer or Egyptian green.*—To produce this marble I use the following colors: ivory drop-black, Chinese blue, light lemon chrome, and small quantity of orange chrome. With the three last colors I form a green color by mixing them together. Of the quantity of diluted cement I take about one-twentieth, which I divide into three parts in basins. I give to the first part a green tint with the green color prepared as described, and a small quantity of black, so as to form the green grayish tint as is found in the real marbles. I use for the second part the same colors, but I take the tint much lighter than the first. To the third part I give a whitish tint, and I use only the pure white cement and a very small quantity of green color. Then I divide the nineteen-twentieths of the cement into three parts. In the first part the chalk color must prevail, though with a greenish reflection. The second must be almost as dark as the first part, but the greenish reflection must prevail. In the third the green color must prevail. When all these tints are prepared, I put a part of each tint prepared for the veins on the plate-glass, and with a long net (about three feet) I trace the veins on the face of the mold or smooth surface in a similar manner to that described to trace the veins of the rouge royal; but I take care to produce these veins sharper. After having traced the veins of the foreground, I allow them to stiffen for a few minutes before tracing the veins of the second ground. When these veins are traced, I lay on them the cement prepared for the background, and I take care to produce various shades. When these veins are entirely covered I complete as before stated.

*Marama or red green, (Pyrenian marble.)*— To produce this marble I use the following colors: ivory black green, composed of Chinese blue, light lemon chrome, and small quantity of orange chrome, similar to the green color used to produce the vert de mer, light purple brown, and a small quantity of vermilion. From the quantity of diluted cement I take about one-twentieth, which I divide into four parts in basins. To the first part, which is largest, I give a whitish tint, shaded with a little green. To the second part, which is a little smaller than the first one, I give also a whitish tint, but darker than the first one. I shade it with green and a little red. To the third part, which is about equal to the second one in quantity, I give a green tint shaded with a little red. To the fourth part, which is the smallest, I give a rather bright tint, with a little of vermilion, but shaded with a little of each of the three first parts. Then I divide the nineteen-twentieths of the diluted cement into three parts. To the first part (about eight-twentieths) I give a dark brown tint with some little purple brown, green black, and a little of vermilion. In this part, although the purple brown prevails, it must bear a slight shade of green. To the second part (about eight-twentieths) I give also a dark tint, with the same colors used for the first part; but in this part the green prevails. To the third part (about three-twentieths) I give a bright tint. In this part vermilion must prevail. When all the tints required to produce this marble are prepared, I use about the same means to trace the veins as those described to trace the veins of the vert de mer. I put on the piece of plate-glass a part of each of the four tints, and then with the net I trace the veins of the foreground, in which the whitish tint must prevail. On these veins I lay the background of the marble by the same means described for the vert de mer. I begin by laying a part of the dark brownish tint, then the second greenish one, and, third, the brightest tint. For this marble, as for the others, I take care to form various shades as it is to be found in real marble.

*Marble, (blanc seiné.)*—To produce this marble I use the following colors: ivory-black, ultramarine-blue, Chinese blue, and a very small quantity of vermilion. From the quantity of diluted cement necessary I take about one-fiftieth, which I divide into two parts in basins, with a little of each of the above colors. I tint these two parts of cement and give them a grayish shade, according to the shades of the veins of the marble to be imitated, and I do two tints, one a little darker than the other. These two tints are to trace the veins. Then I divide the remaining forty-nine fiftieths of the diluted cement to form the background of the marble into three parts. The first part, say twelve-fiftieths, I leave almost plain. The cement being of a pure white, I only shade it with a very little of the above colors. To the second part (about twenty-two fiftieths) I give a white grayish tint. To the third (about fifteen-twentieths) I give a white bluish and grayish tint. To trace the darkest veins, I mix in water a small quantity of each of the above colors. Then, in this colored water, I soak skeins formed with fibers of silk or other suitable material. All this being prepared, I take a small quantity of the first white tint prepared for the background, which I put in a small basin. Then, with a little water, I make this small quantity of white cement a little thinner than the other parts; then, with one hand, I throw it here and there on the face of the mold. This is to form some kind of breaks and to soften the veins. Then, with the skeins soaked in the colored water, I trace the veins by spreading and laying them on the face of the mold, as before described. Then I put on the piece of plate-glass the two tints prepared for the veins. Then, with a net made with thin fibers of silk, about thirty inches long, I trace the veins of the second ground of the marble by soaking this net in the two tints on the plate-glass and laying it on the face of the mold. I repeat this until the veins are properly traced. Then, with a thick piece of silk, which I soak in the whitest tint, I trace the whitish runs of the marble by repeatedly making them touch this fiber when soaked on the face of the mold, or, better, on the skeins and veins. I take care to trace these whitish runs almost in parallel lines with the veins. Then I lay on these "skein veins" the three tints prepared for the background, so as to cover these veins entirely. Then I take off the skeins, and with a trowel I level this ground-coat of marble, and complete as before.

*Bleu fleuri, (bardilla.)*—To produce this marble I use the following colors: ivory-black, Chinese blue, ultramarine-blue, light purple brown, and crimson lake. From the quantity of diluted cement I take about one twenty-fourth to form the veins. I divide this one twenty-fourth into three parts. To the first part I give a dark tint with a little reflection of purple, and use some black, Chinese blue, light purple brown, and crimson lake. To the second part I give a paler tint than to the first part, and of a grayish appearance. To the third I give a whitish tint, with a little black and blue. Then I divide the remaining twenty-three twenty-fourths of the cement into three parts for the background. For the first part (about nine twenty-fourths) I give a bluish gray tint, which must be a great deal paler than the two paler parts of the veins. For this part I use black, blue, and a little of crimson lake. To the second part (about ten twenty-fourths) I give a paler tint than to the first part, and I use ultramarine-blue instead of Chinese blue. To the third part (about four twenty-fourths) I give a darker tint than to the two first parts, but paler than the two first parts for the veins. Then I place on the plate-glass a portion of each part prepared for the veins, and with a net about three feet long formed of thin fibers of silk, used to produce the figures of the veins, I trace the veins on the face of the mold or the smooth surface by about the same means as before described to trace the veins of the vert de mer; but I trace these veins in a running or parallel way, as it is to be found in the real marble. When these dark veins are traced, I make the whitish veins or breaks with a fillet formed with a few fibers of silk, which I soak into the whitish part of the cement. I trace these breaks almost parallel with the running veins. When the veins are traced, I form the background of the marble with the three parts of shaded cement prepared for that purpose. I use first the palest, then the medium one, and the last the darkest part; but I take care to mix a little of each part, so as to produce various shades. I lay this shaded cement with one hand in the running way of the veins. When this background is formed, I complete the marble as before.

*Brèche violette, (violet marble.)*—To produce this marble I use the following colors: ultramarine-blue, vermilion, crimson lake, light purple brown, ivory-black, and a little of red chrome and of orange chrome. From the quantity of diluted cement necessary I put a part, (about one-tenth,) which I divide into as many basins as there are colors. Then I tint each of these parts with a small quantity of each of the above colors. Then I divide the remaining nine-tenths into three parts. To the first part (about five-tenths) I give a whitish tint, with a little of ivory-black, ultramarine-blue, and a very small quantity of vermilion and orange chrome. To the second part (about three-tenths) I give also a whitish tint, but with a little of ivory-black, ultramarine-blue, and a very small quantity of violet. To the third part (about one-tenth) I give a white yellowish tint. These three last parts are to form the background of the marble, and the seven first parts are to form the veins, and also to shade a little the parts used to form the backgrounds. I mix a little with each part, so as to shade them in accordance with the corresponding colors in real marble. When the above tints are all prepared, I use the pieces of pasteboard as aforesaid, so as to form the various brèches as they are to be found in the real marble. Before, however, laying the pieces of pasteboard on the surface of the mold or the smooth surface, I form on the edges the veins which always separate the brèches from the other parts of the marble. To make these veins I use some of the tinted cement prepared for this purpose. To lay the tinted cement on these edges, I use a small molding-tool or a kind of knife, as before described. I take care to form these veins in accordance with the corresponding veins in real marble. These pieces of pasteboard I lay on the face of the mold or the smooth surface. Then to form some veins between the brèches I use nets prepared according to the figures of the veins in real marble. I soak these nets in a dark purple and violet water, which water I color with ultramarine-blue, a little of ivory-black, vermilion, light purple brown, and crimson lake. On these nets, laid on the face of the mold or smooth surface, I form the running parts or the soft brèches of the marble, and I use the tinted cement prepared for that purpose for the background. Then I remove these nets and level a little of this cement, and to stiffen it slightly I sift on it a small quantity of dry superfine cement. Then I remove the various pieces of pasteboard, and to prevent the veins traced on their edges sticking on them I pass a thin knife between these edges and the veins. Then on the empty places left by the removal of the pieces of pasteboard I form the sharp brèches, varied in shades or color as in the real marble. To form these brèches I use almost an equal portion of each part of the tinted cement, and complete as before.

*Sienna marble.*—To produce this marble I use the following colors: raw sienna, burnt sienna, orange chrome, light lemon chrome, red chrome, a little of vermilion, crimson lake, light purple brown, ivory-black, and ultramarine-blue. From the necessary quantity of diluted cement I take about one-sixteenth, which I divide into as many basins as there are colors. Besides, I put a part (about another one-sixteenth) of the said quantity of diluted cement, to which I give a whitish tint with a little of ultramarine-blue and light lemon chrome. This tint I use to form the whitish running veins, breaks, and small spots, as is found in the real marble. Then I tint each part of the cement, divided in basins as aforesaid, with a quantity of the aforesaid colors, at first all separately, and after I mix them a little with each other, so as to form shades corresponding to the shades of the real marble, I use these tints at first to form the small veins of the upper ground, and afterward to shade the parts of tinted cement to form the background. I make more use of raw sienna than of the other colors. Then I divide the fourteen-sixteenths of the diluted cement into three parts. The first part (about eight-sixteenths) I shade with the raw sienna already mixed in one of the small quantities, and so as to shade this part according to the corresponding shade of the real marble I use a small quantity of all the aforesaid colors except the ivory-black and ultramarine-blue. To shade the second part (about four-sixteenths) I use the same colors; but I make them much paler than the first part. To shade the third part (about two-sixteenths) I use also the same colors; but I use more of the burnt sienna, so as to form a deeper shade. When all the shades required for this marble are prepared, I put on the face of mold, here and there, some pieces of pasteboard, so as to form the sharp points of the marble which are surrounded by veins. To form the veins on the edges of these pasteboards, I use the same means described before for the brèche violette; but the shades used are in accordance with the shades of the sienna marble, which are of a dark purple color. To form the other parts of the veins between the pieces of pasteboard, I use nets or skeins soaked in water colored with light purple brown, ultramarine-blue, ivory-black, and a little of vermilion. The shade of this water must be of a dark purple; but I use also a few nets or skeins soaked in water having a reddish shade. On these nets or skeins I form the whitish runs or breaks and spots. I use for this a fiber or fillet of silk. On these nets and skeins I form the background with the tinted cement prepared for that purpose. I take care to mix a little together the tinted parts of cement, so as to produce the various shades as is found in the real marble. Then I remove the nets or skeins and level this background. Then I stiffen it a little with some dry superfine cement. Then I remove the pieces of pasteboard, and on the empty places produced by their removal I form the other parts of the background, and finish as before.

*Sarancolino.*—To produce this marble I use the following colors: ultramarine-blue, light purple brown, vermilion, crimson lake, light lemon chrome, red chrome, and a little of ivory-black. From the necessary quantity of diluted cement I take about one-sixteenth, which I divide into as many parts as there are colors, and I tint these parts with some of the above colors respectively and separately in basins. I also put a part (another one-sixteenth) which I use to form the whitish veins or breaks. Then I divide into three parts. I tint first part (about eight-sixteenths) with a small quantity of each of the above tinted parts, except the ivory-black; but I use more of the ultramarine-blue, so as to give a whitish shade to this part. I use about the same tints for the second part, four-sixteenths; but I do this part much paler than the first part and less bluish. To the third part (about two-sixteenths) I give a kind of chamois shade. I then make three particular shades for the veins. To the first I give a bright red tint with light purple brown, vermilion, a little of crimson lake, and red chrome. To the second I give a deep brown tint, which I brighten with vermilion, and to form this shade I use light purple brown, ivory-black, vermilion, ultramarine-blue, and a little of crimson lake. To the third part I give a bright yellowish tint, for which I use the following colors: red chrome, orange chrome, vermilion, and crimson lake. Besides these three last tints, I form great variety of shades by mixing the above tints a little with each other. When all the tints required to produce this marble are ready, I first use the pieces of pasteboard to form the brèches before laying these pieces of pasteboard on the face of the mold or the smooth surface. I form the veins on their edges with parts of the tints prepared for that purpose. Then with a net formed according to the figures of real marbles (which I soak in the tints prepared for the veins) I trace the bright veins, but before I form the whitish breaks, also with a net or fillet soaked in the whitish tint; and when the veins are traced in accordance with those in real marble, I lay down the background between the brèches or pieces of pasteboard. To form the background, I use principally the three first tints, so as to form the great variety of shades as they appear in real marble. I mix a little of almost all the other tints with these three said tints, although I use these three tints separately. I, however, mix a small portion of the two other tints when I use one, so as to produce those distinct shades, lighter or darker, as they are to be found in the real marble. When this background between the pieces of pasteboard is done, I level it a little and stiffen it with a little of dry superfine cement. Then I remove carefully these pieces of pasteboard, as I did for the brèches violette, and on the empty places left by their removal I form the brèches with parts of almost all the tints; but I take care to vary the shades of these in accordance with those of the real marble, and finish as before.

*Red granite.*—To produce this marble I use the following colors: light purple brown, burnt sienna, ivory-black, and ultramarine-blue. I also use small pieces of reddish, grayish, and whitish alabaster, so as to produce the crystallized bright parts found in the real granite. The necessary quantity of cement being diluted, I divide it into the following proportions: the first part, eight-sixteenths; the second, four-sixteenths; the third, two-sixteenths, and the fourth, two-sixteenths. Then I give to the first part a reddish brownish tint, and to obtain this shade I use part of all the above colors. I give to the second also a reddish tint, but a little paler than the first one, and use more of the burnt sienna. To the third I give dark brown tint. To produce this shade I use more of the ivory-black than in the other two parts. To the fourth part I give a whitish grayish tint. When all these tints are prepared, I spread on the face of the mold the small pieces of alabaster, and in order to stick these pieces of alabaster on the face of the mold or the smooth surface I soak them in a small quantity of each of the four above tints. These small quantities are prepared separately in a basin, in which I dissolve a certain extra quantity of alum, in order to make this cement set and crystallize quicker than by the ordinary way. When these pieces of alabaster are well soaked, I pour them out of the basins on a piece of plate-glass, and before I spread same on the face of the mold I mix them a little together. When this is set a little, I throw with one hand, through the fingers, with a certain force, the remainder of the tint, until I cover all the surface. Then I level this ground-coat of marble carefully with a trowel, and in order to absorb the quantity of superfluous water used to mix up tints I spread on this tinted cement some dry superfine cement, which I previously mix with some of the above colors in a dry state. Instead of removing this dry cement, as for other marbles, I press it in, so as to form a compact mass with the tinted cement, which is still in a moist state. Then I finish as before.

*Spanish brocatella.*—To produce this marble I use the following colors: raw sienna, burnt sienna, red chrome, ultramarine-blue, ivory drop-black, light purple brown, orange chrome, vermilion, and a small quantity of crimson lake. When the necessary quantity of cement is diluted, I at first mix a certain quantity of the above colors separately with a small quantity of the diluted cement. Then I divide the remainder of the diluted cement into five parts, as follows: the first, about five-sixteenths; the second, about five-sixteenths; the third, three-sixteenths; the fourth, two-sixteenths, and the fifth, one-sixteenth. To the first part I give a reddish brown tint, which I divide into two parts, almost equal. One of these two shades must be lighter than the other one. The darkest of these two shades must be brighter, and with a little vermilion it must also have a slight shade of purple.

To produce this last shade I use part of the above colors, except the raw sienna and the orange chrome. To the second part I give a yellow reddish tint, and I divide this part into two parts, almost equal, and I make one of these two parts, lighter than the other one. To shade these two parts I use some raw sienna, burnt sienna, red chrome, orange chrome, a very small quantity of light purple brown, vermilion, and crimson lake. To the third part I give a kind of violet tint with a slight shade of purple. To shade this part I use some ultramarine-blue, light purple brown, crimson lake, and a little vermilion and burnt sienna. To the fourth part I give a whitish tint, and I divide it into two parts, almost equal. One part must have a small shade of blue, and the other must be grayish. I use to shade these two parts some ultramarine-blue and a little black and red. To the fifth part I give a dark brownish tint. To shade this last part I use some black, ultramarine-blue, light purple brown, and a little of burnt sienna and crimson lake. When all the shades required to produce this marble are ready, I begin by tracing some small short veins here and there with part of the last tint, (the brown one.) Then I mix a certain quantity of small lumps of alabaster with a small quantity of each of the above tints, and spread this here and there on the face of the mold. Then I cover entirely the face of the mold by throwing on it with a certain force with the fingers the remainder of all of the above tints; but I use these tints separately to produce the various shades and figures found in the real marble. Then with a trowel I level with care the grained coat or face, and to absorb the superfluous quantity of water used to dilute the cement I spread on the coat of marble a certain quantity of superfine dry cement, and instead of removing it, as I do on light marble, I press this dry cement into the diluted tinted cement, and finish as before.

*Vert campan.*—To produce this marble I use the following colors: Chinese blue, ivory drop-black, light lemon chrome, light purple brown, and a small quantity of vermilion, red chrome, and orange chrome. With the Chinese blue and light lemon chrome and a small quantity of orange chrome, I produce a green color. The quantity of cement required having been diluted, I divide it into five parts, as follows: the first one, seven-sixteenths; the second part, five-sixteenths; the third, two-sixteenths; the fourth, one-sixteenth, and the fifth, one-sixteenth. To the first part I give a light greenish tint. To the second part also a light greenish tint, but darker than the first part. With a part of the first part I make a delicate pink shade. To form these tints I use a little of green and a very small quantity of vermilion. To the third part I give a brown reddish tint, which I produce by the use of some light purple brown, green, and a small quantity of black and vermilion. To the fourth part I give a brown reddish tint, but brighter than the last one. To the fifth part I give a whitish greenish tint. To form the tints for the veins, which must be of a dark green and grayish tint, I use a part of most of the above colors. When all the shades required are so prepared, I at first trace the bold breaks which run across the running veins, and to do so I use a thick fiber of silk, which I soak in the last-mentioned whitish greenish tint; then with a net about two feet long and eight inches broad, divided into meshes of an inch, formed of thin fiber of silk, which I soak in the tint prepared for the veins in a running way across the breaks. Then I throw on them a part of the first tint, (the light greenish one,) and so I do with the pinky one. Then with the fourth and fifth (tints) parts I form the running reddish or brownish shades, which run across the whitish breaks and in the way of the veins. Then I cover entirely the veins with the first and second tints, and complete as before.

*Italian griotte.*—To produce this marble I use the following colors: light purple brown, vermilion, ivory drop-black, ultramarine-blue, and a very small quantity of crimson lake and burnt sienna. The necessary quantity of cement being diluted, I divide it into three parts, as follows: The first part (ten-sixteenths) must be a brown reddish tint, for which I use part of all the above colors. The second part (about four-tenths) must be darker than the first; so I use more of the black color. The third (about two-sixteenths) must be the brightest tint, to produce which I use more vermilion than in the two first tints. Then from the above tints I take about one-sixteenth of the whole to make the tint for the veins, which must be of a very dark brown shade. To do so I use more of black and blue than in the three first tints. With this last tint I trace the veins on the face of the mold, in which tint I soak a net similar to the one used to trace the veins of the vert campan. When the veins are traced according to the formation of the veins in real marble, (griotte,) I spread on them some small lumps of alabaster, so as to produce the bright spots as they are to be found in the real marble. Then I cover these veins with the three first tints, but I use each of them separately. When the surface is all covered, I spread on it some dry cement, as described for the granite, and finish as before.

*Napoleon marble.*—To produce this marble I use the following colors: Vandyke brown, ivory drop-black, ultramarine-blue, burnt sienna, and a small quantity of vermilion and light purple brown. From the quantity of diluted cement I take about one-twelfth for the light and other veins and breaks. Then I divide the remainder of the cement as follows: The first part (seven-twelfths) must be of a light tint, for which purpose I use some Vandyke brown, a very small quantity of ultramarine-blue, burnt sienna, and vermilion. The second part (about two-twelfths) must be darker than the first one. To do so I use more Vandyke brown than in the first part. The third part (about two-twelfths) must be of a warmer shade than the two first parts, and to make it so I use more burnt sienna and vermilion than in the two first parts. These three above tints are to form the background of the marble. Then with the one-twelfth of the diluted cement put aside I do the tints for the veins as follows: The first part (about five-twelfths) must be a white grayish tint, to produce which I use some of ultramarine-blue, black, and very little of the above tints. The second part (about four-twelfths) must be also of a white grayish, but with a shade of bluish, tint. I use for this tint about the same colors as for the first tint; but I use more blue than in the first one. The third part (two-twelfths) must be darkened with Vandyke brown and very small quantity of all the above colors. The fourth (about one twenty-fourth) must be the darkest part and of a brownish tint. To produce this I use more black burnt sienna and light purple brown than in the other tints. To the last part (about one twenty-fourth) I give the brightest shade. To produce this I use a little of vermilion and a very little of Vandyke brown and burnt sienna. When all the tints required are ready, I begin by tracing the breaks with a net similar to the one used for the rouge royal, which I soak in the two lightest tints. Then with a small fiber of silk I trace the small bright veins which are to be found here and there in the real marble, to produce which I use the last tint. Then with the two darkest tints I trace the darkest veins similar to those which are to be found in the real marble. When the veins are so traced, I lay down the background with the tints prepared for that purpose, and in order to produce various shades I mix these tints a little with each other. When the surface is entirely covered, I complete as before.

By my process artificial marbles may be produced rapidly and economically, and the said products may be rendered impermeable by means of a special sort of enamel applied to the marble surface, and by means of a hydraulic cement applied to the back part of the marbled surface.

In order to simulate marble I use a particular sort of cement, composed of gypsum or plaster-stone and alum, colored according to the sort of marble to be imitated. This process admits of obtaining objects of all forms and dimensions—such as plates, columns, moldings, &c.

The process is as follows: I begin by setting up the frame, so to speak, of the object I wish to produce in marble. This frame or negative may be composed of cement, plaster, iron, glass, or any other appropriate material, so long as the surface of said material be as smooth as possible.

In order to produce very smooth marble surfaces, the frames or molds should be preferably composed of polished iron or glass, and their dimensions should be made to correspond to those of the marble surfaces to be produced. They should also be placed or fixed on suitable stands or supports. The negative surfaces should be adjusted so as to turn freely on their supporting-pieces, in order that they may be placed in a vertical position to allow of the plates being easily removed when the latter are of large dimension.

In order to produce circular or curved forms and construct a mold or shell of wood, this mold or shell is covered with a coat of cement or plaster, so as to form a surface sufficiently smooth, which surface is subsequently covered with a composition of gum-lac dissolved in spirits of wine. The curved or rounded surface thus prepared forms the negative of the object to be produced.

Chimney-pieces, pilasters, &c., are formed in solid molds composed of plaster, cement, iron, or other suitable material.

Before forming the veins I place the different parts formed by the molds on a table, in order to be able to vein each piece separately. When the veined surface is formed and the superfluous water soaked off, I close the mold, and I carefully fill the joints of said mold with cement, colored so as to correspond with the shade of marble to be reproduced. I then apply to the back of this veined coat a coat of cement thickly mixed, in order to strengthen the former and give a proper degree of thickness to the object.

Fluted or twisted columns are made in molds similar to those above described. When the surface of the column to be constructed is made in a wooden mold, I cover with a coating of plaster or cement of thickness of about three centimeters. The diameter of this mold ought to be of conical form, so as to permit of its being removed from the shaft of the column to be formed, which should be hollow, a core of iron or other material being inserted in case of the column being destined to support a certain weight. On this mold, which I previously cover with a coat of gum-lac and grease, in order to be able to remove it easily, I place a coat of cement, very thickly mixed, of a thickness of about two centimeters. This coat should be as uniform as possible, and have the profiles of the column to be constructed. Nevertheless, this coat, though being quite uniform, should be to a certain extent rough, for the purpose of facilitating the adhesion of the marble coating. I obtain this roughness by pricking small lozenge-shaped holes in the cement when it is beginning to set.

In order to form the veined surface, I proceed as follows: First of all I begin by preparing a surface of cement or plaster having the negative form of the column laid out flat. On this surface or table I spread thick paper, which I coat with gum-lac, so as to render it as impermeable as possible and to glaze it slightly. This preparation is necessary in order to prevent the veins from drying before the marble is formed. On this paper I place the veined coat, to which I give a thickness of one centimeter. I confine this coat by placing pieces of wood at each end. I then cause this coat to adhere to the rough shaft or core already described, which, resting on the pieces of wood above mentioned, allows of the veined coat being uniformly and evenly wound round it. When the cement has begun to set and is of a certain consistence—that is to say, in about forty-eight hours after being placed on the shaft—I rub it with pumice-stone, using at the same time water, and I finish the polishing by means to be described farther on. This done, I remove the plaster core, and I thus obtain a hollow column. When the column is not required to be exceptionally strong, the mold may be left in it. When the surface or mold of the negative part of the object to be produced is well prepared, I mix with water the requisite quantity of cement for effecting the work. This cement being destined to form the veined coat, I give it the consistence of the plaster used for molding statues, ornaments, &c. I, however, vary that consistence according to the shades and veins of the marble to be imitated. Generally speaking, I give the principal veins more density than those of the background. I mix in small vessels the colors necessary for veining the marble. These colors should be mixed separately with a proper quantity of cement. I trace the veins by means of fibers of silk or flax, or even of cotton. I form these fibers to correspond with the configuration of the veins in the marble to be imitated, and I make them as large as possible, in order to be able to trace the veins over a large surface easily and rapidly, and to reproduce exactly the forms and effects of the veins of no matter what kind of marble. I lay the fiber on a large table, and I humect it by means of a brush dipped in colored water or in cement tinted according to the shades of the marble to be imitated. I press the brush with a certain amount of force against the fiber, holding it perpendicularly in order that the said fiber may be thoroughly saturated with the colored water or cement. When it is thus completely saturated, I raise it carefully from the table, holding it by both extremities, (when the fiber is of considerable dimensions, two persons are necessary to perform this operation,) and I lay it upon the surface intended to imitate the marble. On this fiber forming the veins I then lay the background of the marble, using for this purpose cement previously colored to the proper tint, and a few minutes afterward—that is to say, as soon as the cement forming the background is well impregnated with the color of the veins—I remove the fiber with care, holding it by both extremities, as when lifting it from the table. Still holding it in the same manner, I carefully wash the fiber in a large rectangular tub filled with water, and in order to dry it I spread it upon flannel laid on a table.

In order to soak off the superfluous water employed in mixing the cement, I lay for a few minutes on the surface imitating the marble drying substances, such as plaster or very dry cement. When the marble coat is sufficiently dry and compact, enough to acquire, on becoming crystallized, the hardness of marble, I double this coat with another composed of cement mixed very thick. In order to render the back of this coat impermeable, I lay upon it a thin layer (five millimeters, or thereabout) of hydraulic cement. I give the previous coat a thickness of from one to two centimeters, according to the dimensions, and when it has become hardened (the time taken being from eighteen to twenty-four hours, according to the rapidity with which it sets) I remove the rough cement by introducing a trowel between it and the marble surface. After removing a slab or other article, either from a mold or from any flat or curved surface, I lay it aside for forty-eight hours, in order that the alum contained in the composition of the cement may have time to become oxidated or crystallized, and so give greater consistence to the marble surface. In order to polish this marble surface, I rub it with a kind of pumice-stone, or with what is known as "scotch-stone," and I then stop all the pores of the surface with cement colored to about the lightest tint of the background. When this stopping-coat is quite set, which will require no less than twenty-four hours, I again rub the surface, but this time with scotch-stone only. Finally I proceed to enamel the surface, having previously thoroughly dried the surface to be thus treated.

For enameling, I use white or transparent varnish for veined marbles, and for black marble I employ black varnish. The varnishes should be of good quality, so as to allow of being polished after having been exposed to the proper degree of heat. I commence by laying on a coat of varnish by means of a brush, and I expose the surface thus varnished to a temperature of about 80° centigrade during twenty-four hours, placing it in a heated room or stove. When the article has cooled, I rub it with pumice-stone, in order to remove the asperities produced by air-bubbles, and then, if necessary, I touch it up with colors mixed in turpentine, using a brush for the purpose. When these touches are dry, I lay on another coat of varnish, which I heat as before described. If this second coat of varnish appears sufficient—that is to say, if no asperities caused by air-bubbles exist on the surface—I rub the latter with finely-pulverized tripoli, using a piece of flannel dipped first in water and then in oil. I finally end by rubbing the surface with a piece of dry linen. When the article to be enameled is thoroughly dry and well prepared, and when the operations of varnishing and heating are properly conducted, two coats of varnish are sufficient. If, however, after the second coat has been applied and heated, any asperities still remain, a third coat should be laid on, and heated and polished as before. In order to avoid too sudden a transition from heat to cold, and vice versa, the workshop where the varnishing is done should be contiguous to the heated room, and should itself be heated, so that the temperature may be the same in all parts.

This new process of enameling has a double advantage, for it permits of retouching the veined surfaces in case the veining performed by means of a fiber, as above described, should not produce a perfect imitation of the marble to be copied; and, besides, this coating of enamel renders impermeable the article thus treated, which can therefore be advantageously employed in the open air. This enamel has also the effect of heightening the tints and colors of the marble—a result which cannot be obtained by any other process employed up to now for producing artificial marble.

By my process of enameling I am enabled to produce on the marble surface an infinite variety of decorative designs—such as flowers, landscapes, &c.

I claim—

1. The fabrication of artificial impermeable marble by means of cements, gypsum, or alum applied to polished surfaces or placed in molds, fibers being applied to the surfaces for the purpose of forming the veins, as above substantially set forth and described.

2. The application to the surface of artificial marble of an enamel obtained by laying on one or more coats of varnish, by exposing the article to the action of heat after each coat, by polishing the varnished surface with pumice-stone, and finally with tripoli, as above substantially described and set forth.

The foregoing specification of my improved process for producing artificial marbles and rendering the same water-proof and fire-proof signed by me this 25th day of October, 1883.

RICHARD GUELTON.

Witnesses:
ROBT. M. HOOPER,
JEAN BAPTISTE ROLLAND.